(12) United States Patent
Eckert

(10) Patent No.: US 11,084,251 B2
(45) Date of Patent: Aug. 10, 2021

(54) METHOD FOR PRODUCING LAMINATE COMPOSITE MATERIALS

(71) Applicant: JOHNS MANVILLE, Denver, CO (US)

(72) Inventor: Bernhard Eckert, Freudenberg-Boxtal (DE)

(73) Assignee: Johns Manville, Denver, CO (US)

( * ) Notice: Subject to any disclaimer, the term of this patent is extended or adjusted under 35 U.S.C. 154(b) by 154 days.

(21) Appl. No.: 16/345,029

(22) PCT Filed: Nov. 3, 2017

(86) PCT No.: PCT/EP2017/078196
§ 371 (c)(1),
(2) Date: Apr. 25, 2019

(87) PCT Pub. No.: WO2018/087007
PCT Pub. Date: May 17, 2018

(65) Prior Publication Data
US 2019/0275765 A1  Sep. 12, 2019

(30) Foreign Application Priority Data
Nov. 8, 2016  (DE) ............ 10 2016 013 314.7

(51) Int. Cl.
*B32B 3/00* (2006.01)
*B32B 13/14* (2006.01)
(Continued)

(52) U.S. Cl.
CPC ............ *B32B 13/14* (2013.01); *B32B 3/263* (2013.01); *B32B 3/266* (2013.01); *B32B 3/30* (2013.01); *B32B 5/022* (2013.01); *B32B 5/142* (2013.01); *B32B 7/12* (2013.01); *B32B 27/12* (2013.01); *B32B 27/304* (2013.01); *B32B 27/322* (2013.01); *E04F 13/0866* (2013.01); *E04F 13/16* (2013.01); *E04F 15/107* (2013.01); *B32B 2250/03* (2013.01); *B32B 2250/40* (2013.01); *B32B 2260/021* (2013.01);
(Continued)

(58) Field of Classification Search
CPC ....... B32B 5/022; B32B 27/12; B32B 27/304; B32B 2262/101; B32B 2471/00; B32B 2327/06; B32B 2260/021
See application file for complete search history.

(56) References Cited

U.S. PATENT DOCUMENTS 5,462,642 A * 10/1995 Kajander ............ D04H 1/72
 162/116
10,336,035 B2 * 7/2019 Pierson .................. B32B 27/38

\* cited by examiner

*Primary Examiner* — Elizabeth E Mulvaney
(74) *Attorney, Agent, or Firm* — Robert D. Touslee

(57) ABSTRACT

A method for producing laminate composite materials, as well as the laminate composite materials produced by this method and their use are described. The laminate composite materials are sandwich-like in construction and based on halogenated polymers and comprise a first laminar structure formed from halogenated polymer and a second laminar structure formed from halogenated polymer as well as at least one textile mat structure based on inorganic fibres, which is disposed between the first and the second laminar structure. The textile mat structure based on inorganic fibres comprises regions with high air permeability and regions with low air permeability, through which the two laminar structures formed from halogenated polymer are monolithically bonded together.

15 Claims, 1 Drawing Sheet

(51) Int. Cl.
  *B32B 3/26* (2006.01)
  *B32B 3/30* (2006.01)
  *B32B 5/02* (2006.01)
  *B32B 5/14* (2006.01)
  *B32B 7/12* (2006.01)
  *E04F 13/08* (2006.01)
  *E04F 13/16* (2006.01)
  *E04F 15/10* (2006.01)
  *B32B 27/12* (2006.01)
  *B32B 27/30* (2006.01)
  *B32B 27/32* (2006.01)

(52) U.S. Cl.
  CPC ..... *B32B 2260/046* (2013.01); *B32B 2262/10* (2013.01); *B32B 2262/101* (2013.01); *B32B 2305/28* (2013.01); *B32B 2307/724* (2013.01); *B32B 2307/732* (2013.01); *B32B 2419/04* (2013.01)

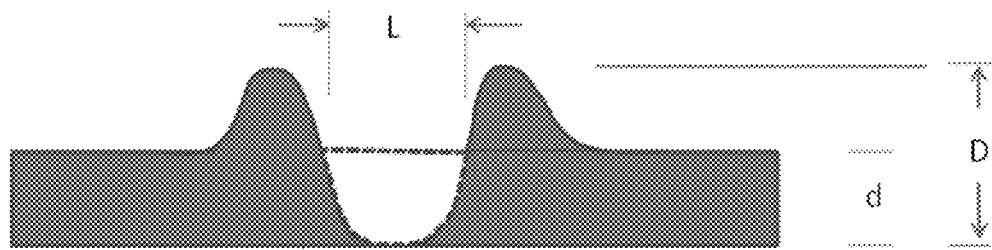

METHOD FOR PRODUCING LAMINATE COMPOSITE MATERIALS

BACKGROUND OF THE INVENTION

The present invention relates to a method for the production of laminate composite materials, as well as to the laminate composite materials produced by this method and to their use. Furthermore, the starting products necessary for the production of the laminate composite materials in accordance with the invention are also suitable for the production of other composite materials.

BRIEF SUMMARY OF THE INVENTION

Laminate composite materials have been known for a long time and are used in many applications. Modern laminate composite materials have a layered construction, wherein each individual layer has a specialised function, either a mechanical and/or optical/haptic function. In this manner, the overall properties can be optimized as a function of the intended purpose. In particular, in this manner, textile mat structures, for example nonwovens or non-crimp fabrics, formed from reinforcing materials are being increasingly used.

The production of nonwovens, in particular of wet laid nonwovens, has been known for more than 50 years and was originally used in processes and equipment for papermaking.

In order to produce wet laid nonwovens, for example glass fibre nonwovens, the glass fibres are dispersed in water in what is known as a pulper, wherein the proportion of glass fibres is approximately 0.1-1% by weight. In this regard, care must be taken that during dispersion, the glass fibres are damaged as little as possible, i.e, essentially no fibres are broken. The dispersed glass fibres are temporarily stored in one or more storage containers. They are discharged via the headbox, whereupon the concentration of glass fibres is reduced by a factor of 10 to 20. Discharging is carried out onto a rotary machine screen through which the water is drawn off and the wet laid glass fibre nonwoven is formed. The withdrawn water is returned to the process, i.e. it is recycled. Subsequently, a binder is applied to the freshly formed glass fibre nonwoven which, after drying or curing, consolidates the glass fibre nonwoven so that it can be rolled up or processed further.

The glass fibrous materials, glass fibre lengths and glass fibre diameters as well as the basis weight and the quantity of binder are adjusted as a function of the field of application.

Glass fibre nonwovens are used, inter alia, for the production of laminar rolled goods or sheet material which are used in widely different applications. By way of example, nonwovens of this type in combination with what are known as B-stage binders, which have been known for some years, are used, inter alia, in the production of decorative composite materials, for example based on wood materials.

Furthermore, nonwovens, in particular glass nonwovens for impregnation with B-stage resins, are already known, wherein mineral fillers may be present in the B-stage binder resin. Materials of this type are suitable for the production of fireproof laminates such as those described in EP 2 431 173 A1.

Furthermore, nonwovens with mineral fillers to reinforce plasterboard or what are known as paint substrates with mineral coatings are known; after installation on the wall, they require further painting.

In order to use the aforementioned materials, which are used in ships, on railways or in particular in public and/or commercial buildings, because of the risks brought about by fire, they have to be made even safer. The ever more stringent legal requirements relating to fire protection are known. These increased requirements increasingly also include individual components of interior works such as, for example, laminates for furniture, building elements, or flooring elements. Elements of this type taken by themselves may sometimes be classified as unsafe as regards the fire protection requirements, or can only be produced so as to be classified as fire-protected at great expense. As an example, for paper-based laminates, large proportions of flame protection agents are added in order to make flammable paper either difficult to burn or inflammable. Using glass nonwovens as supports for substances of this type means that the fire protection requirements will be much easier to comply with.

When producing luxury vinyl tile (LVT) floor coverings, it would therefore be desirable to integrate the positive properties of reinforcing textile mat structures based on glass fibres into them. LVT materials are laminate composite materials based on halogenated polymers, in particular based on polyvinyl chloride (PVC), which have a sandwich-like laminate construction.

Initial searches for a solution indicated, however, that integrating a reinforcing textile mat structure based on glass fibres between two layers based on halogenated polymers, in particular based on polyvinyl chloride (PVC), is no easy matter. For this reason, until now, only reinforcement based on individual glass fibre/glass filaments in the form of filament-shaped non-crimp fabrics or glass roving has been known. When producing composite materials of this type, discontinuous methods are almost exclusively employed.

However, in order to exploit the full potential of glass fibre reinforcement, the objective was to integrate reinforcing textile mat structures based on glass fibres into sandwich-like laminate composite materials based on halogenated polymers, in particular based on polyvinyl chloride (PVC). In this regard, continuous production methods should also be able to be employed.

Thus, the present invention concerns a method for the production of laminate composite materials based on halogenated polymers, in particular based on polyvinyl chloride (PVC), comprising the following steps:
(i) producing, providing or supplying a laminar structure formed from halogenated polymer, in particular based on polyvinyl chloride (PVC),
(ii) applying a textile mat structure based on inorganic fibres, preferably glass fibres, onto at least one side of the laminar structure in accordance with step (i),
(iii) producing, providing or supplying and applying a second laminar structure formed from halogenated polymer, in particular based on polyvinyl chloride (PVC), to the structure obtained in accordance with step (ii), wherein the second laminar structure is applied to the side to which the textile mat structure based on glass fibres has already been applied,
(iv) laminating the structure obtained in accordance with step (iii) by applying pressure and/or temperature,
characterized in that
(v) the textile mat structure based on inorganic fibres, preferably glass fibres, is a nonwoven, preferably a glass fibre nonwoven, and the fibre nonwoven, preferably the glass fibre nonwoven, comprises regions with high air permeability and regions with low air permeability.

In a variation of the method in accordance with the invention, one or more additional layers may optionally be applied to or be present on the laminar structure, for example decorative and/or protective layers, wherein these additional layers are already present or are optionally applied before or after lamination in accordance with step (iv). These additional layers are located on the side of the first and/or second laminar structure which faces away from the textile mat structure, i.e. on one of the two outer sides of the prepared laminate composite material.

In a further aspect, the present invention concerns a sandwich-like laminate composite material based on halogenated polymers, in particular based on polyvinyl chloride (PVC), comprising:
(i) a first laminar structure formed from halogenated polymer, in particular based on polyvinyl chloride (PVC),
(ii) a second laminar structure formed from halogenated polymer, in particular based on polyvinyl chloride (PVC),
(iii) a textile mat structure based on inorganic fibres, preferably glass fibres, which is disposed between the first and the second laminar structure,
(iv) the first laminar structure in accordance with (i), the textile mat structure based on inorganic fibres, preferably glass fibres, in accordance with (ii) and the second laminar structure in accordance with (iii) being bonded together by lamination,
characterized in that
(v) the textile mat structure based on inorganic fibres, preferably glass fibres, is a nonwoven, preferably a glass fibre nonwoven, and the fibre nonwoven, preferably the glass fibre nonwoven, comprises regions with high air permeability and regions with low air permeability.

In a variation of the invention, the laminate composite material in accordance with the invention may optionally comprise one or more additional layers on at least one outer side, for example decorative and/or protective layers. These additional layers are already present on the laminar structure or are optionally applied before or after lamination in accordance with step (iv) of the method. These additional layers are located on the side of the first and/or second laminar structure which faces away from the textile mat structure, i.e. on one of the two outer sides of the prepared laminate composite material.

Wet laid textile mat structures formed from glass fibres with regions with high and low air permeability as well as their production are already known in principle from U.S. Pat. No. 5,462,642.

A further aspect of the present invention is constituted by the use of a textile mat structure based on inorganic fibres, preferably glass fibres, wherein the textile mat structure is a fibre nonwoven, preferably a glass fibre nonwoven, and the fibre nonwoven, preferably the glass fibre nonwoven, comprises regions with high air permeability and regions with low air permeability, for the production of sandwich-like laminate composite materials based on halogenated polymers, in particular based on polyvinyl chloride (PVC), as well as for the production of wall or ceiling panels in which the textile mat structure in accordance with the invention based on inorganic fibres, preferably glass fibres, wherein the textile mat structure is a fibre nonwoven, preferably a glass fibre nonwoven, and the fibre nonwoven, preferably the glass fibre nonwoven, comprises regions with high air permeability and regions with low air permeability, forms a decorative covering layer on a support. In a further application, the textile mat structure based on inorganic fibres, preferably glass fibres, wherein the textile mat structure is a fibre nonwoven, preferably a glass fibre nonwoven and the fibre nonwoven, preferably the glass fibre nonwoven, comprises regions with high air permeability and regions with low air permeability is used a carpet backing, wherein the carpets may be woven or nonwoven carpets.

In a further aspect, the present invention thus provides a composite material comprising:
(i) a support material, in particular a plasterboard or a fibrous insulating material;
(ii) a textile mat structure based on inorganic fibres, preferably glass fibres, which is disposed on the support material,
(iii) the support material in accordance with (i) and the textile mat structure in accordance with (ii) being bonded together by lamination,
characterized in that
(iv) the textile mat structure based on inorganic fibres, preferably glass fibres, is a nonwoven, preferably a glass fibre nonwoven, and the fibre nonwoven, preferably the glass fibre nonwoven, comprises regions with high air permeability and regions with low air permeability.

Preferably, the aforementioned composite material with a support material is a wall or ceiling panel. The lamination may be accomplished with the aid of binders, in particular chemical or thermoplastic binders. The composite is characterized by a particularly aesthetic visual appearance.

The laminate composite material in accordance with the invention described above and the textile mat structures used in composite materials based on inorganic fibres, preferably glass fibres, wherein the textile mat structure is a fibre nonwoven, preferably a glass fibre nonwoven and the fibre nonwoven, preferably the glass fibre nonwoven, comprises regions with high air permeability and regions with low air permeability, are in turn valuable starting products and also constitute an aspect of the present invention.

DETAILED DESCRIPTION OF THE INVENTION

Laminar Structure Formed from Halogenated Polymer

The laminar structure used in accordance with the invention formed from halogenated polymer is preferably based on polyvinyl chloride (PVC). The laminar structure may be in the form of a foil, but is usually in the form of an extruded or calendered structure, for example a board, and in general is not subjected to any restrictions; usually, it involves materials which are already used in the production of sandwich-like laminate composite materials, in particular in the production of luxury vinyl tiles (LVT).

The laminar structures in accordance with the invention formed from halogenated polymer may also be initially formed when pressing the laminate, i.e. during lamination. In this regard, particles or chips formed from halogenated polymer, preferably formed from PVC, are applied in a loose form onto the conveyor belt, or onto the textile mat structure. The laminar structure is formed by fusion of the particles or chips during pressing or lamination. This process may advantageously be carried out continuously, because high press temperatures and concomitant shorter cycle times are then possible.

Particularly when producing luxury vinyl tiles (LVT), the sandwich-like laminate composite materials in accordance with the invention based on halogenated polymers, in particular based on polyvinyl chloride (PVC), and textile mat structures based on inorganic fibres, preferably glass fibres, usually have a total thickness of between 1 mm and 15 mm. The textile mat structure in accordance with the invention based on inorganic fibres, in particular the wet laid glass fibre nonwovens, preferably have a thickness "d" in the range of a minimum of 0.2 mm. The thickness of the textile mat structure should not exceed 20% of the total thickness of the laminate.

Textile Mat Structure Based on Inorganic Fibres

In particular, the textile mat structures based on inorganic fibres, preferably glass fibres, employed in accordance with the invention are wet laid nonwovens based on inorganic fibres, preferably glass fibres.

The glass fibres employed are discontinuous fibres, i.e. what are known as staple or chopped fibres. In addition to glass fibres, other inorganic fibres may be used, for example ceramic fibres and/or mineral fibres or even mixtures thereof, which replace at least a portion of the glass fibres.

Examples of suitable mineral and ceramic fibres are aluminosilicate, ceramic, dolomite, wollastonite fibres, or fibres from vulcanites, preferably basalt, diabase and/or melaphyre fibres, in particular basalt fibres. Diabases and melaphyres are collectively known as paleobasalts and diabase is frequently known as dolerite.

Suitable glass fibres include those which are produced from A glass, E glass, S glass, C glass, T glass or R glass.

The average length of the mineral fibres or glass fibres is usually between 5 and 120 mm, preferably 5 to 30 mm. The average fibre diameter of the mineral fibres or glass fibres is usually between 5 and 30 µm, preferably between 6 and 22 µm, particularly preferably between 8 and 18 µm.

In addition to the aforementioned diameters, what are known as glass microfibres may also be used. The preferred average diameter of the glass microfibres here is between 0.1 and 5 µm.

The textile mat structures based on glass fibres in accordance with the invention, in particular, however, the wet laid nonwovens based on glass fibres, are consolidated with a binder. The binder that is present may be completely or only partially cured.

The binder is usually applied to the freshly constructed textile mat structure based on inorganic fibres, preferably glass fibres, which is preferably a wet laid fibre nonwoven, preferably a wet laid glass nonwoven, and which is still located on the rotary machine screen during production.

The binder in this regard is preferably applied in the form of an aqueous binder system which comprises at least one organic binder. The proportion of organic binder(s) in the aqueous binder system is usually between 10 and 40% by weight, preferably between 15 and 30% by weight, wherein the figures given are with respect to the binder system after complete drying.

The total quantity of the organic binder which is applied is usually between 10 and 40% by weight, preferably between 15 and 30% by weight, wherein the figures are given with respect to the binder system after complete drying.

Surplus binder may be withdrawn via the machine screen so that the binder is distributed uniformly.

There are generally no restrictions as regards the organic binder(s) in the binder system, so that any of the known organic binders used for production of nonwovens may be used. Because of their subsequent use, binders of this type, i.e. organic binders and inorganic binders, are used which are compatible with the halogenated polymer, in particular with the polymer based on polyvinyl chloride (PVC).

Organic binders are chemical binders, preferably based on urea-formaldehyde, phenol-formaldehyde, melamine-formaldehyde or mixtures thereof, formaldehyde-free binders, self-curing binders which cross-link chemically to completion without adding a catalyst. Cross-linking is preferably thermally induced. Suitable further binders are polycarboxylates, in particular polyacrylates, or copolymers based on maleic acid, polymer dispersions formed from vinyl acetate and ethylene, or similar co-binders. Urea binders are particularly suitable. The aforementioned chemical binders may additionally also comprise saccharides and/or starches.

In addition to the aforementioned organic binders, inorganic binders may also be used. Inorganic binders of this type may replace the aforementioned organic binders almost completely or at least in part, i.e. be used in mixtures with the aforementioned organic binders. An example of a suitable inorganic binder is water glass, in particular based on sodium silicate.

The proportion of inorganic binders is between 0-18% by weight, wherein the figures are given with respect to the binder system after complete drying.

The aqueous binder systems are applied using known methods. Doctor blades, application rollers, flat dies or curtain coating methods are particularly suitable.

In addition, the aqueous binder system may contain known additives. The proportion of these additives in the aqueous binder system is between 0 and at most 5% by weight, wherein the figures are given with respect to the binder system after complete drying. Drying of the nonwoven and curing of the binder is usually carried out at temperatures between 90° C. and a maximum of 250° C. in a dryer, wherein the residence time in the dryer is typically between 30 and 60 seconds in the aforementioned range of temperatures. The drying acts to cure or cross-link the binders and residual water that is present is removed, Drying equipment which is already used in the prior art in fibre technology is employed for drying. Usually, drying is carried out in a hot air dryer.

Because of the machine screen which is specially employed, the textile mat structures based on inorganic fibres produced and used in accordance with the invention, which are preferably wet laid nonwovens based on inorganic fibres which are preferably constructed from glass fibres, have regions with high air permeability and regions with low air permeability. The regions with high air permeability and the regions with low air permeability preferably have a difference in air permeability of at least 50%, i.e. the air permeability of the regions with high air permeability is at least 50% high than the air permeability of the regions with low air permeability. Particularly preferably, the difference in the air permeability is at least 100% or more.

The textile mat structures based on inorganic fibres, in particular based on glass fibres produced and used in accordance with the invention are characterized by regions with high air permeability and regions with low air permeability; these regions are produced during production of the textile surface using the wet laid process. In this regard, special machine screens are used in which the screen has regions with low or no permeability for the process water (pulper water) in which the fibres are dispersed. This leads to irregular deposition of the fibres on the machine screen. These textile mat structures based on inorganic fibres produced and used in accordance with the invention with regions of high and low air permeability are described in more detail in FIG. 1.

The textile mat structure based on inorganic fibres, in particular based on glass fibres produced and used in accordance with the invention, which are preferably wet laid nonwovens based on inorganic fibres which preferably are constructed from glass fibres, preferably has a mean basis weight between 10 and 350 g/m², in particular between 20 and 200 g/m², particularly preferably between 40 and 140 g/m², wherein the figures are given with respect to a glass nonwoven without considering the residual moisture, i.e. after drying. In the regions with high air permeability, the basis weight is a maximum of 70% by weight of the aforementioned mean basis weight. The regions with high air permeability are further characterized by a geometry which is defined by the parameters "d", D or L, as well as L1 and L2. Furthermore, the edge of the region with high air permeability is banked up; the production method necessitates this. Particularly after lamination, the regions which are banked up produce regions in the textile mat structure with a higher specific density and bring about an additional circumferential reinforcement around the regions with high air permeability which also makes "tearing" of the monolithic contact surfaces more difficult.

The regions with high air permeability are also colloquially described as a "hole" or "depression" and are defined as a region in which the local thickness of the nonwoven, as can be seen in FIG. 1, is a maximum of 80% of the mean nonwoven thickness "d".

In FIG. 1, the textile mat structure based on inorganic fibres produced and used in accordance with the invention, in particular a wet laid glass fibre nonwoven, is described in more detail. The geometry of the regions with high air permeability is defined with the aid of two lengths, i.e. a larger length L1 and a smaller length L2 which lies perpendicular to L1 wherein L1>5 mm, and the ratio L1/L2 is in the range 1-10, preferably 1-5, The ratio L1/L2=1 thus describes a circular geometry. Furthermore, the edge of the regions with high air permeability is banked up. The banking, i.e, the difference $\Delta$, formed by D−d, must be a maximum of 20% of the thickness "d". Thus, the relationship is $\Delta=(D-d)/d<20\%$.

The textile mat structures based on inorganic fibres produced and used in accordance with the invention, in particular the wet laid glass fibre nonwovens, preferably have a thickness "d" in the range 0.2 to 2 mm.

The textile mat structures based on inorganic fibres produced and used in accordance with the invention, in particular the wet laid glass fibre nonwovens, have an air permeability of >1500 L/m² sec.

The regions with high air permeability are distributed uniformly or non-uniformly in the total surface area of the textile mat structure based on inorganic fibres, in particular the wet laid glass fibre nonwovens, and are separated from each other by the regions with low air permeability, wherein the distances between the respective regions with high air permeability are preferably between 5 and 20 mm. In particular with applications as a composite material, in particular as wall or ceiling panels in which the decorative nature is paramount, the pattern may also vary and, for example, may be in the form of a repeat pattern.

The surface area of the regions with high air permeability (monolithic region) is preferably between 5 and 90% of the total surface area of the textile mat structure based on inorganic fibres, in particular of the wet laid glass fibre nonwoven.

The textile mat structures based on inorganic fibres produced and used in accordance with the invention, which are preferably wet laid nonwovens based on inorganic fibres, which are preferably constructed from glass fibres, preferably comprise other fibres formed from organic polymers. In particular, these organic polymer fibres are thermoplastic, synthetic polymers which can be formed by melt spinning which are compatible with the halogenated polymer, in particular with the polymer based on polyvinyl chloride (PVC).

Furthermore, the textile mat structures based on inorganic fibres produced and used in accordance with the invention, which are preferably wet laid nonwovens based on inorganic fibres, which are preferably constructed from glass fibres, also comprise finishes or sizes on the fibres which promote wetting and/or adhesion to the halogenated polymer, including covalent adhesion, in particular to the polymer based on polyvinyl chloride (PVC).

Production of the Textile Mat Structure Based on Inorganic Fibres

The production of the textile mat structures based on inorganic fibres used in accordance with the invention, which are preferably wet laid nonwovens based on inorganic fibres, which are preferably constructed from glass fibres, is carried out using methods which are known per se. As already mentioned, wet laid textile mat structures formed from glass fibres with regions of high and low air permeability as well as their production is already known in principle from U.S. Pat. No. 5,462,642.

The regions with high air permeability and the regions with low air permeability are produced by using special machine screens when producing the mat structure.

The processes described below refer by way of example to the production of glass fibre nonwovens, however the corresponding steps of the process are similar for other fibrous materials, in particular with inorganic fibres, and are known to the person skilled in the art. In general, the fibres are dispersed in water in what is known as a pulper, wherein in the case of glass fibres, the proportion of glass fibres is approximately 0.1% by weight to 1% by weight.

The dispersed glass fibres are usually temporarily stored in one or more storage containers, in which settling out of the glass fibres has to be prevented. This measure is also known to the person skilled in the art.

Discharging of the glass fibre/water dispersion, or discharging in accordance with step (ii), is carried out via the headbox, whereupon the concentration of glass fibres is reduced by a factor of 10-20. This step too is known to the person skilled in the art.

Further auxiliary materials may be added to the water used to produce the glass fibre/water dispersion. In this regard, they are usually thickeners and surfactants. This step is also known to the person skilled in the art.

Discharging of the fibre/water dispersion is carried out onto a special rotating machine screen which has a variable permeability for the water that is present. In this manner, the water is drawn off at a different rate and nonwovens are formed on the machine screen with regions of high air permeability and regions of low air permeability.

The water which is withdrawn is returned to the process, i.e. recycled. In order to produce the wet laid glass nonwoven, known devices are used, for example the Voith Hydroformer® or the Sandy Hill Deltaformer®, which are known in the market.

Application of the binder as well as drying have already been disclosed above and are also applicable to the method described by way of example.

Reinforcement

The textile mat structures based on inorganic fibres produced and used in accordance with the invention, which are preferably wet laid nonwovens based on inorganic fibres, which are preferably constructed from glass fibres, may additionally comprise a further reinforcement.

Typically, laminar reinforcements are added to the upper side of the rotary machine screen on which the wet laid glass fibre nonwoven is formed.

Adding reinforcing filaments and/or yarns is carried out like in the case of laminar reinforcement or individually, i.e. from above or from the side, wherein the reinforcing filaments and/or yarns are installed centrally into the nonwoven that is formed or on the upper and/or low sides. The position of the insertion is set by the exact location of the supply in the region of the nonwoven formation on the machine screen. Finally, the only restrictions are in the construction of the nonwoven formation agents.

Preferably, the reinforcements are reinforcing filaments and/or yarns with a Young's modulus of at least 5 GPa, preferably at least 10 GPa, particularly preferably at least 20 GPa.

The reinforcing filaments, i.e. including monofilaments, rovings or also the yarns, have a diameter between 0.1 and 1 mm or 10-2400 tex, preferably between 0.1 and 0.5 mm, in particular 0.1 and 0.3 mm, and have an elongation at break of 0.5 to 100%, preferably of 1 to 60%.

Preferably, filaments, in particular multifilaments and/or monofilaments based on carbon, glass, glass fibre rovings, mineral fibres (basalt) or wires (monofilaments) of metal or metallic alloys are used as the reinforcements.

For economic reasons, preferred reinforcements consist of glass multifilaments in the form of—essentially—parallel plies of filaments or non-crimp fabrics. Usually, the glass nonwoven is only reinforced in the longitudinal direction by—essentially—parallel plies of filaments.

The reinforcing filaments may be arranged as nets, meshes or non-crimp fabrics. Furthermore, reinforcements in the form of woven fabrics and multiaxial non-crimp fabrics are preferred. Particularly preferably, reinforcements with mutually parallel reinforcing yarns, i.e. warp plies, as well as non-crimp fabrics or meshes are particularly preferred.

The filament thickness may vary between wide limits, depending on the desired property profile. Preferably, the filament thickness is between 20 and 250 filaments per meter. The filament thickness is measured perpendicular to the filament run direction. The reinforcing filaments are preferably added before the glass nonwoven is formed on the upper side of the rotating machine screen. It is also possible to add the filaments during the formation of the glass nonwoven so that they become embedded.

Method for the Production of Laminate Composite Materials Based on Halogenated Polymers The method in accordance with the invention for the production of laminate composite materials based on halogenated polymers, in particular based on polyvinyl chloride (PVC), comprises the following steps:
(i) producing, providing or supplying a laminar structure formed from halogenated polymer, in particular based on polyvinyl chloride (PVC),
(ii) applying a textile mat structure based on inorganic fibres, preferably glass fibres, onto at least one side of the laminar structure in accordance with step (i),
(iii) producing, providing or supplying and applying a second laminar structure formed from halogenated polymer, in particular based on polyvinyl chloride (PVC), to the structure obtained in accordance with step (ii), wherein the second laminar structure is applied to the side to which the textile mat structure based on glass fibres has already been applied,
(iv) laminating the structure obtained in accordance with step (iii) by applying pressure and/or temperature, characterized in that
(v) the textile mat structure based on inorganic fibres, preferably glass fibres, is a nonwoven, preferably a glass fibre nonwoven, and the fibre nonwoven, preferably the glass fibre nonwoven, comprises regions with high air permeability and regions with low air permeability.

In a variation of the method in accordance with the invention, optionally, one or more additional layers may be applied to or be present on the laminar structure, for example decorative and/or protective layers, wherein these additional layers are already present or are optionally applied before or after lamination in accordance with step (iv). These additional layers are on the side of the first and/or second laminar structure which faces away from the textile mat structure, i.e. is in one of the two outer sides of the prepared laminate composite material.

The laminar structures formed from halogenated polymer used in accordance with the invention, in particular based on polyvinyl chloride (PVC), have already been described in detail above. In the method, these are either produced directly (in-line) or in advance (off-line) and provided or supplied. Supply may be carried out continuously, for example by supplying from rolls, or, in fact discontinuously, for example by adding prefabricated materials. The steps (i), (ii) and (iii) may also be carried out simultaneously, for example by supplying from respective rolls.

The textile mat structure supplied in step (ii) based on inorganic fibres, preferably glass fibres, usually covers the entire side of the laminar structure formed from halogenated polymer, in particular based on polyvinyl chloride (PVC), and the second laminar structure formed from halogenated polymer supplied in step (iii) in turn covers the entire textile mat structure based on inorganic fibres, preferably glass fibres. The laminar structures used in steps (i), (ii) and (iii) formed from halogenated polymer and the textile mat structure based on inorganic fibres, preferably glass fibres, preferably have the same coverage, so that the edges do not require further working.

In addition to the three-layered construction given above by way of example, for example PVC→glass→PVC, five-layered constructions may also be envisaged, for example PVC→glass-PVC (core)→glass→PVC. These possible constructions all have in common a disposition of at least one sandwich-like laminate structure, in which at least one textile mat structure based on inorganic fibres, preferably glass fibres, is disposed between two laminar structures formed from halogenated polymer, in particular based on polyvinyl chloride (PVC).

Lamination in step (iv) is carried out by the action of pressure and temperature using rollers or presses in a generally known manner. Normally, the temperature during lamination is between 80° C. and 140° C. for a discontinuous process and 120° C. to 180° C. for a continuous pressing process. The pressures employed are usually 2-4 bar.

By using the textile mat structure in accordance with the invention with regions of high air permeability and regions of low air permeability, the two facing surfaces of the laminar structure formed from halogenated polymer, in particular based on polyvinyl chloride (PVC), come into contact through the regions of the textile mat structure in accordance with the invention with high air permeability and bind together monolithically in these regions. The monolithic contact surface of the two facing surfaces of the laminar structure formed from halogenated polymer, in particular based on polyvinyl chloride (PVC), is preferably a minimum of 5% (% of surface area) with respect to the total surface area of textile mat structure with regions of high air permeability and regions of low air permeability concerned. The monolithic contact surface area should not exceed 90% (% of surface area) with respect to the total surface area of the textile mat structure.

Laminate Composite Materials Based on Halogenated Polymers.

The sandwich-like laminate composite material in accordance with the invention based on halogenated polymers, in particular based on polyvinyl chloride (PVC), comprises:
(i) a first laminar structure formed from halogenated polymer, in particular based on polyvinyl chloride (PVC),
(ii) a second laminar structure formed from halogenated polymer, in particular based on polyvinyl chloride (PVC),
(iii) a textile mat structure based on inorganic fibres, preferably glass fibres, which is disposed between the first and the second laminar structure,
(iv) the first laminar structure in accordance with (i), the textile mat structure based on inorganic fibres, preferably glass fibres, in accordance with (ii) and the second laminar structure in accordance with (iii) being bonded together by lamination,
characterized in that
(v) the textile mat structure based on inorganic fibres, preferably glass fibres, is a nonwoven, preferably a glass fibre nonwoven, and the fibre nonwoven, preferably the glass fibre nonwoven, comprises regions with high air permeability and regions with low air permeability.

In a variation of the invention, the laminate composite material in accordance with the invention may optionally comprise one or more additional layers on at least one outer side, for example decorative and/or protective layers. These additional layers are already present on the laminar structure or are optionally applied before or after lamination in accordance with the method step (iv). These additional layers are located on the side of the first and/or second laminar structure which faces away from the textile mat structure, i.e. on one of the two outer sides of the prepared laminate composite material.

The laminar structure formed from halogenated polymer used in accordance with the invention, in particular based on polyvinyl chloride (PVC), as well as the textile mat structure based on inorganic fibres, preferably glass fibres, have already been described in detail above.

The thickness of the sandwich-like laminate composite material in accordance with the invention based on halogenated polymers, in particular based on polyvinyl chloride (PVC), is usually between 1 and 15 mm, preferably between 3 mm and 10 mm, wherein the textile mat structure based on inorganic fibres employed, in particular the wet laid glass fibre nonwovens, preferably have a thickness "d" of at least 0.2 mm. However, thinner or thicker laminates may also be possible, depending on the application. In particular, when producing luxury vinyl tiles (LVT), the total thickness of the laminate is usually between 1 mm and 20 mm. The thickness of the textile mat structure should not exceed 20% of the total thickness of the laminate.

The total thickness mentioned above is preferably with respect to a three-layered construction, i.e., for example, PVC→glass→PVC, as well as to a five-layered construction, i.e., for example, PVC→glass→PVC (core) →glass→PVC.

By means of the use of textile mat structures based on inorganic fibres in accordance with the invention, preferably glass fibres, which preferably are a nonwoven, in particular a glass fibre nonwoven, sandwich-like laminate composite materials with very homogeneous mechanical properties can be produced which have almost monolithic properties. The monolithic contact surface area of the two facing surfaces of the laminar structure formed from halogenated polymer, in particular based on polyvinyl chloride (PVC), is preferably a minimum of 5% (% of surface area) with respect to the total surface area of textile mat structure used with regions of high air permeability and regions of low air permeability.

Furthermore, the use of the special textile mat structures in accordance with the invention enables the process to be carried out more quickly and more cost-effectively as well as continuously, in particular using what are known as roll processes in which all of the necessary materials are supplied and processed as rolled goods.

Applications

The sandwich-like laminate composite materials in accordance with the invention based on halogenated polymers, in particular based on polyvinyl chloride (PVC), and sandwich-like bonded textile mat structures based on glass fibres may be used for the production of composite materials and laminates, in particular for the production of luxury vinyl tiles (LVT).

Method for the Production of Composite Materials for Use as Wall or Ceiling Panels The method for the production of composite materials for use as wall or ceiling panels comprises the steps of:
(i) producing, providing or supplying a support material, in particular a plasterboard or a fibrous insulating material;
(ii) applying a textile mat structure based on inorganic fibres, preferably glass fibres, to at least one side of the support material in accordance with step (i),
(iii) laminating the structure obtained in accordance with step (i) under the action of pressure and/or temperature, optionally using chemical or thermoplastic binders,
characterized in that
(iv) the textile mat structure based on inorganic fibres, preferably glass fibres, is a nonwoven, preferably a glass fibre nonwoven, and the fibre nonwoven, preferably the glass fibre nonwoven, comprises regions with high air permeability and regions with low air permeability.

Preferably, the aforementioned composite material with a support material is a wall or ceiling panel. The composite material is characterized by a particularly aesthetic visual appearance.

Preferably, the supports used in accordance with (i) are materials based on wood such as, for example, plywood or wood laminate, pressed wood, in particular chipboard and OSB (oriented strand boards), reconstituted wood, in particular porous fibreboard, breathable fibreboard, hard (high density) fibreboard (HDF) and medium density fibreboard (MDF), and arbo-form. Other possible materials are boards formed from paper, cork, cardboard, mineral components and/or what are known as honeycombs. The wood materials are usually board or plank-shaped wood materials which are produced by mixing the various wood particle forms with natural and/or synthetic binders during the course of hot pressing.

The supports in accordance with the invention furthermore comprise substances formed from wood fibres, cellulose fibres, natural fibres or mixtures thereof and a binder, wherein the proportion of binder is usually more than 15°/s by weight. If appropriate, the substances are also reinforced with glass, basalt or synthetic fibres.

Preferably, the papers are papers based on natural, synthetic, mineral or ceramic fibres, or indeed from mixtures of these types of fibres.

The cardboard is preferably cardboard based on natural and/or synthetic fibres, wherein they may also comprise mineral and/or ceramic fibres, as well as mixtures of these types of fibres. The mineral boards are preferably commercially available mineral cardboards with a double-sided cardboard coating, plasterboard, ceramic fibre boards, cement board or plaster of Paris board. If appropriate, the boards may be reinforced with natural and/or synthetic fibres, wherein they may also comprise mineral and/or ceramic fibres. The reinforcing fibres may be in the form of filaments, monofilaments or as staple fibres.

In addition to the materials described, the support may also consist of cork or other plant materials.

The fibrous insulation materials used in step (i) are said fibre nonwovens based on mineral fibres, in particular fibres formed from glass and/or mineral wool which are bonded to the textile mat structure based on inorganic fibres, preferably glass fibres, wherein this is preferably carried out by using thermoplastic adhesives. The fibrous insulation materials are preferably self-supporting, i.e. applied to a support film. The fibrous insulation materials preferably have a thickness of between 5 mm and 250 mm.

The basis weight of the support contained in the composite material depends on the final application and is not subjected to any restrictions.

The textile mat structures based on inorganic fibres, preferably glass fibres, used for the production of the composite material in accordance with the invention described above, wherein the textile mat structure is a fibre nonwoven, preferably a glass fibre nonwoven, and the fibre nonwoven, preferably the glass fibre nonwoven, comprises regions with high air permeability and regions with low air permeability, have already been described in detail; the preferred embodiments in that regard are also valid for this composite material.

Measurement Methods

Air permeability: the air permeability is determined in accordance with DIN EN ISO 9237:1995-12. In this regard it is the averaged air permeability ($LDL_{total}$[L/m²s]), i.e. a measurement on a textile mat structure with regions with high and low air permeability.

Basis weight: the basis weight is determined in accordance with DIN EN ISO 29073-1:1992-08. In this regard it is the averaged basis weight ($FG_{total}$ [gsm]), i.e. a measurement on a textile mat structure with regions with high and low air permeability.

Youngs modulus: the Youngs modulus is determined using stress-strain diagrams at room temperature (23° C.) in accordance with ASTM E111-04 (2010).

Fibre diameter: the fibre diameter is determined microscopically.

Determination of nonwoven thickness: the nonwoven thickness is determined in accordance with ISO 9073-2:1995. The thickness ""d"" is determined on a homogeneous textile mat structure with $FG_{total}$, while the thickness "D" is determined on a textile mat structure with regions with high and low air permeability (basis weight=$FG_{total}$).

Regions with High Air Permeability:

The surface area with high air permeability is determined microscopically.

The determination of the mean basis weight for the region with high air permeability is carried out by stamping out the surface areas defined by L1, L2 and subsequently determining the weight of the stamped surface areas taking the total surface area that has been stamped out into account.

The determination of the air permeabilities, LDL (high air permeability ($LDL_{high}$) vs low porosity($LDL_{low}$), is carried out by computer using the following calculation rule: $LDL_{total}=\{(LDL_{low})\times(\text{surface area }[\%]/100)\}+\{(LDL_{high})\times(\text{surface area }[\%]/100)\}$. $LDL_{total}$ is the measured air permeability for a textile mat structure with regions with high and low air permeability, while $LDL_{low}$ is the air permeability for a homogeneous textile mat structure with thickness ""d"" und and identical basis weight as for the determination of $LDL_{total}$.

What is claimed is:

1. A method for the production of laminate composite materials based on halogenated polymers comprising:
   providing a laminar structure formed from halogenated polymer;
   applying a textile mat structure based on inorganic fibres onto at least one side of the laminar structure;
   applying a second laminar structure formed from halogenated polymer to the textile mat structure based on glass fibres to form a composite; and
   laminating the composite by applying one or both of pressure and temperature, wherein:
   the textile mat structure based on inorganic fibres is a fibre nonwoven;
   the fibre nonwoven comprises regions with high air permeability having a first thickness and regions with low air permeability with a second thickness;
   peripheral edges of the regions with high air permeability are banked up and have a third thickness;
   the third thickness is greater than the second thickness; and
   the second thickness is greater than the first thickness.

2. A sandwich-like laminate composite material based on halogenated polymers comprising:
   a first laminar structure formed from halogenated polymer;
   a second laminar structure formed from halogenated polymer;
   a textile mat structure based on inorganic fibres is disposed between the first laminar structure and the second laminar structure, wherein:
   the first laminar structure, the textile mat structure based on inorganic fibres, and the second laminar structure are bonded together by lamination;
   the textile mat structure based on inorganic fibres is a nonwoven; and
   the fibre nonwoven, comprises regions with high air permeability having a first thickness and regions with low air permeability with a second thickness;
   peripheral edges of the regions with high air permeability are banked up and have a third thickness;
   the third thickness is greater than the second thickness; and
   the second thickness is greater than the first thickness.

3. A carpet product comprising:
   a carpet material; and
   a fibre nonwoven coupled with the carpet material, the fibre nonwoven,
   comprising regions with high air permeability having a first thickness and regions with low air permeability with a second thickness, wherein:
   peripheral edges of the regions with high air permeability are banked up and have a third thickness;
   the third thickness is greater than the second thickness; and
   the second thickness is greater than the first thickness.

4. A composite material comprising:
   a support material,
   a textile mat structure based on inorganic fibres disposed on the support material, wherein:
   the support material and the textile mat structure are bonded together by lamination;

the textile mat structure based on inorganic fibres is a nonwoven; and
the fibre nonwoven comprises regions with high air permeability having a first thickness and regions with low air permeability with a second thickness;
peripheral edges of the regions with high air permeability are banked up and have a third thickness;
the third thickness is greater than the second thickness; and
the second thickness is greater than the first thickness.

5. A textile mat structure based on inorganic fibers comprising;
a fibre nonwoven
comprising regions with high air permeability having a first thickness and regions with low air permeability with a second thickness;
peripheral edges of the regions with high air permeability are banked up and have a third thickness;
the third thickness is greater than the second thickness; and
the second thickness is greater than the first thickness.

6. The textile mat structure as claimed in claim 5, wherein:
a difference in air permeability between the regions with high air permeability and the regions with low air permeability is a minimum of 50%.

7. The textile mat structure as claimed in claim 5, wherein:
a basis weight in the regions with high air permeability is a maximum of 70% by weight of the mean basis weight.

8. The textile mat structure as claimed in claim 5, wherein:
the regions with high air permeability have a local thickness which is a maximum of 80% of the mean nonwoven thickness "d".

9. The textile mat structure as claimed in claim 5, wherein:
the regions with high air permeability have a geometry with a larger length L1 and a smaller length L2; and
L1>5 mm and the ratio L1/L2 is in the range 1-10.

10. The textile mat structure as claimed in claim 5, wherein:
an edge of the regions with high air permeability is banked up and the banking Δ is the difference "D" minus "d" and is a maximum of 20% of the thickness "d".

11. The textile mat structure as claimed in claim 5, wherein:
the regions with high air permeability are separated from each other by the regions with low air permeability; and
the distances between the respective regions with high air permeability is between 5 and 20 mm.

12. The textile mat structure as claimed in claim 5, wherein:
a surface area of the regions with high air permeability is between 5 and 90% of a total surface area of the textile mat structure.

13. The textile mat structure as claimed in claim 2, wherein:
the halogenated polymer comprises polyvinyl chloride (PVC).

14. The textile mat structure as claimed in claim 5, further comprising:
a laminar structure formed from halogenated polymer coupled with the textile mat structure.

15. The textile mat structure as claimed in claim 14, wherein:
the halogenated polymer comprises polyvinyl chloride (PVC).

* * * * *